(12) United States Patent
Yokoi et al.

(10) Patent No.: US 9,909,616 B2
(45) Date of Patent: Mar. 6, 2018

(54) BALL JOINT

(71) Applicant: Kabushiki Kaisha Somic Ishikawa, Tokyo (JP)

(72) Inventors: Yoshihiro Yokoi, Hamamatsu (JP); Masayuki Mizutani, Hamamatsu (JP)

(73) Assignee: KABUSHIKI KAISHA SOMIC ISHIKAWA, Tokyo (JP)

( * ) Notice: Subject to any disclaimer, the term of this patent is extended or adjusted under 35 U.S.C. 154(b) by 111 days.

(21) Appl. No.: 14/442,126

(22) PCT Filed: Sep. 4, 2013

(86) PCT No.: PCT/JP2013/073788
§ 371 (c)(1),
(2) Date: May 12, 2015

(87) PCT Pub. No.: WO2014/083907
PCT Pub. Date: Jun. 5, 2014

(65) Prior Publication Data
US 2016/0238063 A1 Aug. 18, 2016

(30) Foreign Application Priority Data
Nov. 28, 2012 (JP) ................... 2012-260334

(51) Int. Cl.
*F16C 11/06* (2006.01)
(52) U.S. Cl.
CPC ...... *F16C 11/0638* (2013.01); *F16C 11/0614* (2013.01); *F16C 11/0671* (2013.01)

(58) Field of Classification Search
CPC .............. F16C 11/0638; F16C 11/0642; F16C 11/0614; F16C 11/0671; F16C 11/0628;
(Continued)

(56) References Cited
U.S. PATENT DOCUMENTS 5,044,811 A * 9/1991 Suzuki ................... B60G 7/005
403/133
5,152,628 A * 10/1992 Broszat ............... F16C 11/0638
403/122
(Continued)

FOREIGN PATENT DOCUMENTS
EP 0403107 12/1990
EP 0591928 4/1994
(Continued)

*Primary Examiner* — Michael P Ferguson
(74) *Attorney, Agent, or Firm* — Michael Tobias

(57) ABSTRACT

A ball joint includes a bearing seat in the form of a resin ball seat provided within a seat-accommodating portion of a metal socket for slidably and rotatably receiving a ball portion of a ball stud. An end portion of the seat-accommodating portion through which the stud portion passes extends towards the stud portion beyond the spherical center of the ball portion. The ball seat has a covering portion formed on the outer side of a seat opening portion of a ball-accommodating portion which has a spherical shape conforming to a sliding surface of the ball portion of the ball stud. The covering portion is formed by bending the seat opening portion such that it covers the outer periphery of the opening portion of the seat-accommodating portion of the socket.

9 Claims, 2 Drawing Sheets

(58) Field of Classification Search
CPC .............. F16C 11/0633; F16C 11/0666; Y10T 16/734; Y10T 403/32737; Y10T 403/32729
USPC ....... 403/122, 127, 128, 133, 135, 627, 634; 384/49
See application file for complete search history.

(56) References Cited

U.S. PATENT DOCUMENTS

| | | | | |
|---|---|---|---|---|
| 5,676,485 | A * | 10/1997 | Lee | F16C 11/0642 277/635 |
| 6,109,816 | A * | 8/2000 | Iwasaki | B60G 7/005 403/122 |
| 6,505,989 | B1 * | 1/2003 | Pazdirek | F16C 11/0638 403/122 |
| 6,736,565 | B2 * | 5/2004 | Tamatsu | F16C 11/0638 29/898.047 |
| 7,134,801 | B2 * | 11/2006 | Kuroda | B60G 7/001 403/133 |
| 7,195,416 | B2 * | 3/2007 | Holmes | F16C 11/0633 403/122 |
| 2011/0222959 | A1 * | 9/2011 | Beutler | F16C 11/0671 403/122 |

FOREIGN PATENT DOCUMENTS

| | | |
|---|---|---|
| EP | 0702161 | 3/1996 |
| EP | 0971138 | 1/2000 |
| EP | 2610089 | 7/2013 |
| JP | 07054835 | 2/1995 |
| JP | 08303447 | 11/1996 |
| JP | 2000046038 | 2/2000 |

* cited by examiner

BALL JOINT

TECHNICAL FIELD

The present invention relates to a ball joint in which a resin bearing seat which slidably receives a spherical ball portion formed at an end of a shaft-like stud portion is held within a metal socket.

BACKGROUND ART

A ball joint for movably connecting shaft-like components to each other is conventionally used in suspensions and steering mechanisms for vehicles such as automobiles. A ball joint is generally configured such that a spherical ball portion formed at an end of a shaft-like ball stud is slidably held within a metal socket with a resin ball seat (also referred to as a bearing seat) placed between the ball portion and the socket. The ball joint is provided with a dust cover for covering at least an opening of the ball seat so that foreign matter such as water droplets or powder dust is prevented from entering the socket within which the ball portion slides.

For example, below-described Patent Document 1 discloses a ball joint having a rubber dust cover attached to the outer periphery of an opening portion of a resin ball seat which projects from a socket.

PRIOR ART DOCUMENTS

Patent Documents

Patent Document 1: JP 08-303447 A

SUMMARY OF THE INVENTION

In the ball joint described in above-mentioned Patent Document 1, a dust cover is attached to a resin ball seat. Therefore, the dust cover can be attached more tightly compared to the case where the dust cover is attached to a metal ball seat. However, as an end portion of the ball seat projects from the socket, there is a problem that it is difficult to ensure a retaining strength which can resist forces tending to pull out or pry out the ball portion.

The present invention was made in order to cope with the above-described problem, and its object is to provide a ball joint which is capable of ensuring a retaining strength which can resist forces tending to pull out or pry out the ball portion while ensuring the sealing performance of the dust cover.

In order to achieve the above object, a characteristic of the present invention is that in a ball joint comprising a resin bearing seat for slidably receiving a spherical ball portion which is formed at an end of a shaft-like stud portion, a metal socket having a tubular or cup-like seat-accommodating portion for holding the resin bearing seat, and a dust cover for covering a seat opening portion of the bearing seat through which the stud portion passes, in order to prevent foreign matter from entering a space defined by the bearing seat, the socket is formed such that the seat-accommodating portion extends towards the stud portion beyond the spherical center of the ball portion, the bearing seat includes a covering portion which extends to cover the outer periphery of an opening portion of the seat-accommodating portion, and the dust cover is attached to the covering portion.

According to this characteristic of the present invention which is configured in this manner, a ball joint is configured such that the seat-accommodating portion of the socket extends towards the stud portion beyond the spherical center of the ball portion, the bearing seat includes a covering portion which covers the outer periphery of the opening portion of the seat-accommodating portion, and the dust cover is attached to the covering portion. This means that in the ball joint of the present invention, the dust cover is attached to the resin ball seat, and thus it becomes easier to ensure the sealing performance of the dust cover compared to when the dust cover is attached to a metal socket. Moreover, in the ball joint, the metal socket is formed to extend such that a portion of the socket is located radially inward of the covering portion of the ball seat to which the dust cover is attached. This configuration prevents the covering portion and the portion of the ball seat for receiving the ball portion from being deformed by the attachment of the dust cover, and also prevents the portion of the ball seat for receiving the ball portion from being deformed by forces tending to pull out or pry out the ball portion. As a result, the ball joint is capable of ensuring a retaining strength which can resist forces tending to pull out or pry out the ball portion while ensuring the sealing performance of the dust cover.

Another characteristic of the present invention is that in the ball joint, the outer periphery of the opening portion of the seat-accommodating portion of the socket and the inner periphery of the covering portion of the bearing seat which faces the outer periphery of the opening portion are formed to have tapered shapes corresponding to each other.

According to this other characteristic of the present invention which is configured in this manner, in the ball joint, the outer periphery of the opening portion of the seat-accommodating portion of the socket and the inner periphery of the covering portion of the bearing seat which faces the outer periphery of the opening portion are formed to have tapered shapes. Therefore, the distance over which the socket and the ball seat face each other becomes longer, which provides further improved sealing performance.

Another characteristic of the present invention is that the socket of the ball joint is formed to extend towards the stud portion further than a sliding surface of the ball portion which slides on the bearing seat.

According to this other characteristic of the present invention which is configured in this manner, the socket is formed to extend towards the stud portion further than a sliding surface of the ball portion which slides on the bearing seat. This configuration more effectively reduces deformation of the portion of the ball seat for receiving the ball portion caused by forces tending to pull out or pry out the ball portion.

Another characteristic of the present invention is that the bearing seat of the ball joint is secured to the socket in such a manner that its end portion opposite the seat opening portion projects from the socket.

According to this other characteristic of the present invention which is configured in this manner, the bearing seat is secured to the socket in such a manner that its end portion opposite the seat opening portion projects from the socket. This means that even in a ball joint in which a ball seat is secured to a socket at an end thereof opposite a seat opening portion of the ball seat, the region where the ball seat and the socket face each other is bent, and the distance over which the ball seat and the socket face each other becomes longer. This configuration effectively prevents water invasion through a gap at the securing portion of the ball seat.

MODES FOR CARRYING OUT THE INVENTION

Figure 1:
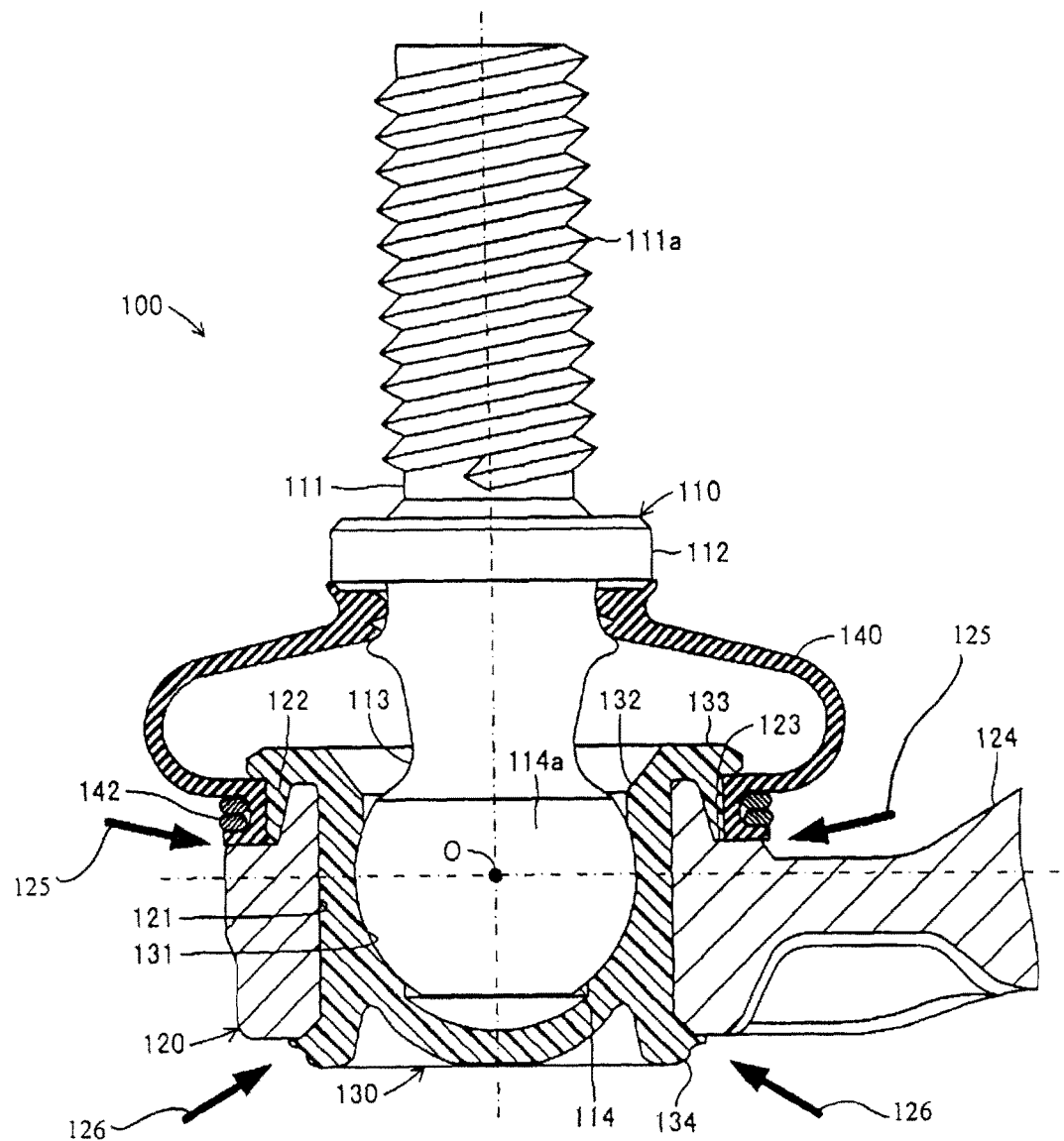
FIG. 1 is a cross-sectional view schematically illustrating the structure of a ball joint according to an embodiment of the present invention.

A ball joint according to embodiments of the present invention will be described below with reference to the drawings. FIG. 1 is a cross-sectional view schematically showing a vertical cross section of a ball joint 100. The figures referred to in the description are schematically illustrated with some components exaggerated in order to facilitate an understanding of the present invention. Therefore, components shown in the drawings may have dimensions, proportions, etc. which are different from the actual ones.

This ball joint 100 is a joint member for connecting components with each other in a suspension mechanism or a steering mechanism employed in a vehicle such as an automobile while permitting the angle between the components to vary. The ball joint 100 shown in FIG. 1 is one of the ball joints provided at both ends of an unillustrated stabilizer link in a suspension mechanism.

(Structure of the Ball Joint 100)

The ball joint 100 is generally constituted by a ball stud 110, a socket 120, a ball seat 130, and a dust cover 140. Of these components, the ball stud 110 is made of steel and includes a ball portion 114 having a substantially spherical shape. The ball portion 114 is formed at one end of a shaft-like stud portion 111, with a flange portion 112 and a constricted portion 113 disposed between the ball portion 114 and the stud portion 111. The stud portion 111 is a connecting part for connecting the ball joint 100 with a component in an unillustrated steering mechanism. It includes a male thread 111a formed at the end opposite the ball portion 114. The ball portion 114 slides within the ball seat 130 and is formed to have a smooth spherical shape so that its sliding surface 114a for sliding on the ball seat 130 can smoothly slide on the inner peripheral surface of the ball seat 130.

The socket 120 is formed by casting a material such as a non-ferrous metal or steel and is configured to have a seat-accommodating portion 121 which has a generally cylindrical tubular shape and a connecting portion 124 which is formed so as to extend in the horizontal direction from the seat-accommodating portion 121. In this embodiment, the socket 120 is made of an aluminum alloy, but other materials such as magnesium or zinc can also be used.

The seat-accommodating portion 121 is a cylindrical tubular portion in which the ball portion 114 of the ball stud 110 is accommodated and held with the ball seat 130 disposed therebetween. The seat-accommodating portion 121 is formed such that its end portion through which the stud portion 111 passes extends towards the stud portion 111 side beyond the spherical center O of the ball portion 114. More specifically, the upper end part of the seat-accommodating portion 121 in the figure is formed to extend to a position corresponding to a portion of the ball portion 114 between the sliding surface 114a thereof and the constricted portion 113. A seat-facing portion 122 and a cover support portion 123 are formed on the outer periphery of an end portion of the seat-accommodating portion 121 located on the side closer to the stud portion 111. The seat-facing portion 122 has a tapered shape such that its outer diameter decreases towards its upper end. The cover support portion 123 extends horizontally from the base of the seat-facing portion 122.

The connecting portion 124 has one end (the left end in the figure) connected to the seat-accommodating portion 121 and the other end (the right end in the figure) connected to an arm portion of an unillustrated stabilizer link. The ball seat 130, which functions as a bearing seat, is provided along the inner periphery of the seat-accommodating portion 121 such that it is disposed between the inner periphery and the ball portion 114 of the ball stud 110 which is held by the inner periphery.

The ball seat 130 is a resin component for slidably holding the ball portion 114 of the ball stud 110. It is formed in the shape of a cylindrical tube with a bottom having an inner surface extending along the spherical sliding surface 114a of the ball portion 114. More specifically, the ball seat 130 has a ball-accommodating portion 131 with a seat opening portion 132, a covering portion 133, and a securing portion 134. The ball-accommodating portion 131 has a spherical shape corresponding to the sliding surface 114a of the ball portion 114 of the ball stud 110. The covering portion 133 is formed on the outer side of the seat opening portion 132 of the ball-accommodating portion 131. The securing portion 134 extends from an outer peripheral portion of the ball-accommodating portion 131 on the bottom side thereof such that the securing portion 134 forms a hollow cylindrical shape.

The covering portion 133 is formed by bending the seat opening portion 132 of the ball-accommodating portion 131 such that it extends to cover the outer periphery of the opening portion of the seat-accommodating portion 121 of the socket 120, that is, to cover the seat-facing portion 122. More specifically, the covering portion 133 extends radially outward from the seat opening portion 132 of the ball-accommodating portion 131, and a part of the radially extending portion extends towards the cover support portion 123 of the socket 120 to form a ring-like protrusion having a length to reach the cover support portion 123. The inner periphery of the covering portion 133, which faces the seat-facing portion 122, is formed to have a tapered shape corresponding to the tapered shape of the seat-facing portion 122 so that it comes into contact with the seat-facing portion 122. The covering portion 133 has an outer periphery parallel to the direction of the axis of the ball stud 110 (the vertical direction in the figure).

The securing portion 134 is a part for securing the ball seat 130 along with the covering portion 133 to the seat-accommodating portion 121 of the socket 120. The securing portion 134 is formed so as to have a straight shape when the ball seat 130 is formed. When secured to the seat-accommodating portion 121, the securing portion 134 is deformed radially outward by hot crimping.

The ball seat 130 is made of a synthetic resin such as a polyetheretherketone resin (PEEK), a polyimide resin (PI), a polyacetal resin (POM), a polyvinyl chloride resin (PVC), a polyurethane resin (PUR), a polycarbonate resin (PC), a polystyrene resin (PS), a nylon resin (PA-6T, 9T), polypropylene (PP), or the like.

The dust cover 140 is provided on the outer periphery of the covering portion 133 of the ball seat 130 so as to cover an upper portion of the ball seat 130 and the ball portion 114 of the ball stud 110 which is accommodated in the ball-accommodating portion 131 of the ball seat 130. The dust cover 140 is made of elastically deformable rubber, a soft synthetic resin, or the like. It is formed with a generally cylindrical tubular shape which bulges outwards at its central portion. The stud portion 111 of the ball stud 110 is inserted into one open end (on the upper side in the figure) of the dust cover 140, and the dust cover 140 is secured by elastic force at its portion directly under the flange portion 112 of the stud portion 111. The other open end (on the lower side in the figure) of the dust cover 140 is secured by a circlip 142 so as to fit onto the outer periphery of the covering portion 133. In this manner, foreign matter is prevented from entering an internal space defined by the ball seat 130.

(Manufacture of the Ball Joint 100)

The manufacture of a ball joint 100 which is configured in this manner will be described. In the description of a manufacturing process for the ball joint 100, manufacturing steps which are not directly related to the present invention will be omitted as appropriate.

First, an operator prepares the ball stud 110, the socket 120, and the ball seat 130, which are components of the ball joint 100. The socket 120 is formed, for instance, by a separate forming process of various kinds such as a casting process such as aluminum die casting or a forging process of steel. The securing portion 134 of the ball seat 130 is formed so as to have a straight hollow, cylindrical shape which allows the securing portion 134 to pass through the seat-accommodating portion 121 of the socket 120. Next, the operator press fits the ball portion 114 of the ball stud 110 into the ball-accommodating portion 131 of the ball seat 130. Specifically, the operator press fits the ball portion 114 into the ball-accommodating portion 131 with unillustrated grease applied onto the inner side of the ball-accommodating portion.

Next, the operator secures the ball seat 130, which accommodates the ball portion 114, in the seat-accommodating portion 121 of the socket 120. More specifically, the operator inserts the ball seat 130, which accommodates the ball portion 114, into the seat-accommodating portion 121 of the socket 120 through an open end (on the upper side in the figure) thereof. As a result, the covering portion 133 of the ball seat 130 is engaged with the upper end of the seat-accommodating portion 121 such that it covers the upper end and the outer periphery (the seat-facing portion 122) of the seat-accommodating portion 121. At the same time, the securing portion 134 of the ball seat 130 projects from the other open end (on the lower side in the figure) of the seat-accommodating portion 121. Next, the operator softens the securing portion 134 of the ball seat 130 by heating (such as by ultrasonic crimping) to allow it to be plastically deformed radially outward so that the securing portion 134 is engaged with the other open end (on the lower side in the figure) of the seat-accommodating portion 121. As a result, the operator can secure the ball seat 130 to the seat-accommodating portion 121 of the socket 120.

Next, the operator attaches the dust cover 140 to the ball seat 130 which has been secured to the socket 120. More specifically, after preparing the dust cover 140, the operator fits one end (the upper end in the figures) of the dust cover 140 onto the outer periphery of the ball stud 110, while fitting the other end (the lower end in the figures) of the dust cover 140 onto the outer periphery of the covering portion 133 of the ball seat 130. Then, the operator attaches the circlip 142 to the dust cover 140, which is fitted onto the covering portion 133 of the ball seat 130, to secure the dust cover 140 on the ball seat 130, whereby the ball joint 100 is completed.

(Operation of the Ball Joint 100)

Next, the operation of the ball joint 100 which is configured in this manner will be described. In this embodiment, an explanation will be given with respect to an example in which the ball joint 100 is incorporated into a suspension mechanism of a vehicle such as an automobile. A suspension mechanism is an apparatus which maintains the traveling stability and steering stability of a vehicle by attenuating vibrations in the vehicle from the road surface and reliably bringing the wheels into contact with the road surface. The ball joint 100 supports the load from the vehicle while allowing the ball stud 110 to rotate or swing in a prescribed direction in the suspension mechanism.

The ball joint 100 installed on a vehicle (not shown) can be splashed with water at the boundary between the dust cover 140 and the socket 120 during travel of the vehicle as shown by arrows 125 in FIG. 1. Since the dust cover 140 of the ball joint 100 is attached to the resin ball seat 130, a good sealing fit is achieved between them to effectively prevent water from entering the interior of the dust cover 140 and the interior of the ball seat 130, thereby providing adequate sealing performance.

The ball joint 100 installed on a vehicle may be splashed with water at the boundary between the securing portion 134 of the ball seat 130 and the socket 120 during travel of the vehicle as shown by arrows 126 in FIG. 1. The region of the ball joint 100 where the ball seat 130 and the socket 120 face each other is bent at the covering portion 133 of the ball seat 130, and the distance over which the ball seat 130 and the socket 120 face each other becomes longer. In addition, the dust cover 140 is attached to the resin ball seat 130. Therefore, water invasion through a gap at the securing portion 134 of the ball seat is effectively prevented.

In the ball joint 100, a force tending to pull out and/or pry out the ball portion 114 of the ball stud 110 may act on the ball portion 114 depending on traveling conditions of the vehicle. A force tending to pull out the ball portion is a force which is exerted on the ball portion in the axial direction of the ball stud 110 in such a manner that the ball portion 114 is pulled away from the interior of the ball seat 130. A force tending to pry out the ball portion is a force which is exerted on the ball portion in such a manner that, while the ball portion 114 slides within the ball-accommodating portion 131, a force which tends to pull out the ball portion 114 is exerted on the ball portion 114. When a force tending to pull out and/or pry out the ball portion is exerted on the ball portion, the ball portion 114 presses the ball-accommodating portion 131 of the ball seat 130, urging the ball-accommodating portion 131 to deform such that the seat opening portion 132 expands. However, this deformation is prevented because the seat-accommodating portion 121 of the socket 120 surrounds the seat opening portion 132. As a result, the ball portion 114 of the ball stud 110 of the ball joint 100 is prevented from coming off the ball-accommodating portion 131 of the ball seat 130 during travel of the vehicle.

As can be understood from the above description of the method of operation, according to the above-described embodiment, the ball joint 100 is configured such that the seat-accommodating portion 121 of the socket 120 extends towards the stud portion 111 beyond the spherical center O of the ball portion 114 and such that the ball seat 130 which serves as a bearing seat includes the covering portion 133 which extends to cover the outer periphery of the opening portion of the seat-accommodating portion 121 and to which covering portion the dust cover 140 is attached. This means that in the ball joint 100 of the present invention, the dust cover 140 is attached to the resin ball seat 130, and thus it becomes easier to ensure sealing performance of the dust cover compared to when the dust cover 140 is attached to the metal socket 120. Moreover, the metal socket 120 of the ball joint 100 is formed to extend such that a portion of the socket 120 is located radially inward of the covering portion 133 of the ball seat 130 to which the dust cover 140 is attached. This configuration prevents deformation of the covering portion 133 and the portion of the ball seat 130 for receiving the ball portion 114 caused by the attachment of the dust cover 140, and it prevents deformation of the portion of the ball seat for receiving the ball portion 114 caused by a force tending to pull out or pry out the ball portion 114. As a result, the ball joint 100 is capable of ensuring a retaining strength to resist a force tending to pull out or pry out the ball portion 114 while ensuring the sealing performance of the dust cover 140.

The present invention is not limited to the above-described embodiment, and a variety of modifications can be made without departing from the scope of the object of the present invention. In the drawings used to illustrate the following variations of the present invention, components corresponding to those in the above-described embodiment are designated by the same reference numerals, and their explanation will be omitted.

In the above-described embodiment, the upper end part of the seat-accommodating portion 121 of the socket 120 is formed to extend to a position corresponding to a portion of the ball portion 114 between the sliding surface 114a of the ball portion 114 and the constricted portion 113. Therefore, the ball joint 100 can prevent deformation of the ball-accommodating portion 131 caused by a force tending to pull out or pry out the ball portion 114, thereby preventing the ball portion 114 from coming off. However, the present invention is not limited to the above-described embodiment, and other embodiments are possible as long as the socket 120 is formed such that the end part of the seat-accommodating portion 121 extends towards the stud portion 111 side past the spherical center O of the ball portion 114, or in other words, past an equator portion of the ball portion 114 where the ball portion 114 bulges most towards the ball-accommodating portion 131. Preferably, the end part of the seat-accommodating portion 121 located closer to the stud portion 111 is formed to extend towards the stud portion 111 side further than the sliding surface 114a of the ball portion 114 and more preferably to a position corresponding to a portion between the sliding surface 114a and the constricted portion 113. The equator portion of the ball portion 114 is a portion where the surface of the ball portion 114 intersects a plane which passes through the spherical center O of the ball portion 114 and which is perpendicular to the axis of the ball stud 110.

In the ball joint 100 of the above-described embodiment, the outer periphery of the opening portion of the seat-accommodating portion 121 of the socket 120 and the inner periphery of the covering portion 133 of the ball seat 130 which faces the outer periphery of the opening portion are formed to have tapered shapes corresponding to each other. However, it is sufficient if the outer periphery of the opening portion of the seat-accommodating portion 121 of the socket 120 and the inner periphery of the covering portion 133 of the ball seat 130 which faces the outer periphery of the opening portion are configured so as to face each other. For example, they may be formed to have straight shapes (non-tapered surfaces) corresponding to each other.

The outer periphery of the opening portion of the seat-accommodating portion 121 of the socket 120 and the inner periphery of the covering portion 133 of the ball seat 130 which faces the outer periphery of the opening portion may be configured such that they come into contact with each other, or such that they oppose each other with a small gap between them. When the outer periphery of the opening portion of the seat-accommodating portion 121 of the socket 120 and the inner periphery of the covering portion 133 of the ball seat 130 which faces the outer periphery of the opening portion are configured such that they come into contact with each other, sealing performance is improved. When they are configured such that they face each other with a small gap between them, the workload in fabrication of these members is reduced and ease of assembly is improved.

Figure 2:
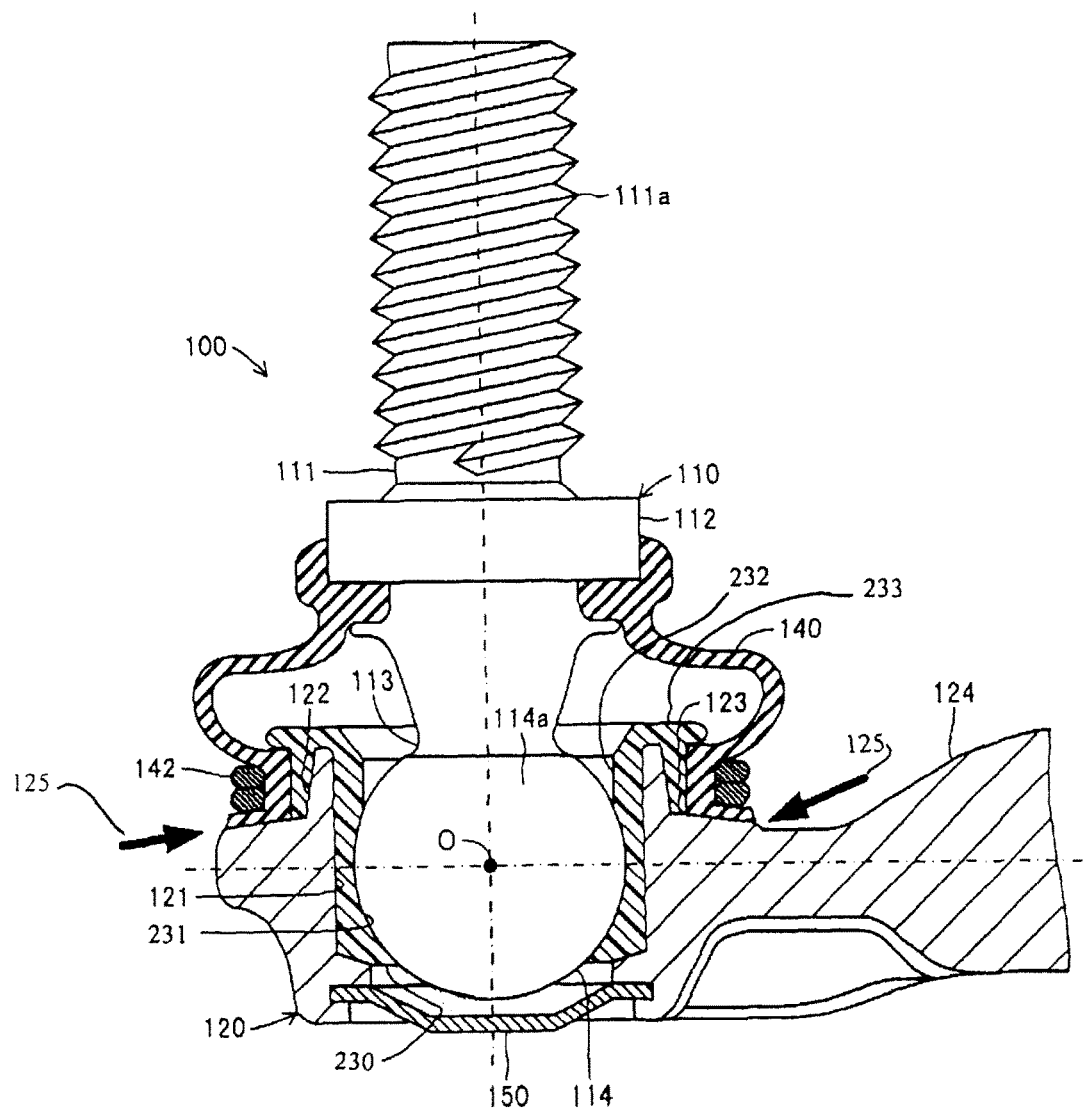
FIG. 2 is a cross-sectional view schematically illustrating the structure of a ball joint according to a variation of the present invention.

FIG. 2 illustrates an alternative embodiment having a ball seat 230. The ball seat 230 includes a ball-accommodating portion 231, a seat opening portion 232, and a covering portion 233 corresponding to the ball-accommodating portion 131, the seat opening portion 132, and the covering portion 133 of FIG. 1. The cover support portion 123 of the socket 120 and a part of the covering portion 233 of the ball seat 230 which opposes the cover support portion 123 may be formed as inclined surfaces. This configuration allows the ball joint 100 to have enhanced sealing performance because the distance over which the cover support portion 123 faces a part of the covering portion 233 which opposes the cover support portion 123 become longer than when they are formed to extend in the horizontal direction in the figure (as in FIG. 1).

As an alternative to the illustrated embodiments, a male thread can be formed on the outer periphery of the opening portion of the seat-accommodating portion 121 of the socket 120, and a female thread which mates with the male thread can be formed on the inner periphery of the covering portion 133 or 233 of the ball seat 130 or 230 which faces the outer periphery of the opening portion. In this case, it becomes possible to secure the ball seat 130 or 230 to the socket 120 by engaging these threads with each other.

In the ball joint 100 of the embodiment of FIG. 1, the ball seat 130 is secured to the socket 120 in such a manner that its end portion opposite the seat opening portion 132 projects from the seat-accommodating portion 121 of the socket 120. However, as shown in FIG. 2, the ball joint 100 may be configured such that the bottom portion of the seat-accommodating portion 121 of the socket 120 is closed by a metal plug 150 so that the bottom side of the ball seat 230 does not project from the seat-accommodating portion 121.

In the embodiment of FIG. 1, the ball seat 130 has a cup-like cylindrical shape with a bottom. However, the ball seat 130 may have a shape other than a cup-like shape as long as the ball seat 130 has the covering portion 133. For example, as shown in FIG. 2, the ball seat 230 may have a hollow cylindrical shape with no bottom.

In the above-described embodiments, the dust cover 140 is secured to the ball seat 130 or 230 using the circlip 142. However, the dust cover 140 may be configured to have a band member incorporated therein which is functionally equivalent to the circlip 142, or the dust cover 140 may be configured to have elasticity which enables the dust cover 140 to be secured to the ball seat 130 or 230.

In the above-described embodiments of the present invention, the ball joint 100 is used in a stabilizer link in a suspension mechanism. However, a ball joint 100 according to the present invention is of course not limited to this use. This ball joint 100 can be widely used in a steering mechanism or the like as well as in a suspension mechanism for a vehicle such as an automobile.

LIST OF REFERENCES

O: spherical center of ball portion
100: ball joint
110: ball stud
111: stud portion
112: flange portion
113: constricted portion
114: ball portion
114a: sliding surface
120: socket
121: seat-accommodating portion
122: seat-facing portion
123: cover support portion
124: connecting portion
130: ball seat
131: ball-accommodating portion
132: seat opening portion
133: covering portion
134: securing portion
140: dust cover
142: circlip
150: plug

The invention claimed is:

1. A ball joint comprising:
a metal socket comprising a seat-accommodating portion having a top surface, a first wall which protects upwards from the top surface of the seat-accommodating portion and extends in a circumferential direction of the socket around an axis of the socket, and a cylindrical bore which communicates between an exterior of the seat-accommodating portion at an upper end of an inner peripheral surface of the first wall and an interior of the seat-accommodating portion;
a resin bearing seat which is disposed inside the bore of the seat-accommodating portion of the socket without being bonded to the socket, the bearing seat having an inner surface, a seat opening portion, and a covering portion which covers the first wall of the seat-accommodating portion and comprises a second wall which extends in a circumferential direction of the bearing seat around the first wall and abuts the top surface of the seat-accommodating portion of the socket;
a ball stud which extends through the seat opening portion of the bearing seat and includes a ball portion which is slidably received in the bearing seat and has a sliding surface which slidably contacts the inner surface of the bearing seat, and a stud portion which extends away from the ball portion, the bore of the seat-accommodating portion of the socket extending towards the stud portion beyond a spherical center of the ball portion, the bore having a constant diameter from the upper end of the inner peripheral surface of the first wall to the spherical center of the ball portion;
a dust cover which prevents foreign matter from entering the bearing seat and extends between the ball stud and the seat-accommodating portion and is sealed against the top surface of the seat-accommodating portion and an outer peripheral surface of the second wall of the covering portion of the bearing seat; and
a retaining member which extends around the dust cover in a circumferential direction of the dust cover and presses the dust cover against the second wall of the covering portion of the bearing seat to retain the dust cover on the covering portion of the bearing seat, the first wall of the seat-accommodating portion extending farther from the top surface of the seat-accommodating portion of the socket than the retaining member in an axial direction of the socket.

2. A ball joint as claimed in claim 1 wherein the first wall has an upper end and a lower end, and an outer diameter of the upper end of the first wall is no greater than an outer diameter of the lower end of the first wall.

3. A ball joint as claimed in claim 2 wherein the outer diameter of the first wall decreases from the lower end to the upper end of the first wall, and an inner diameter of the second wall decreases from a lower end to an upper end of the second wall.

4. A ball joint as claimed in claim 3 wherein the first wall has a frustoconical outer peripheral surface and the second wall has a frustoconical inner peripheral surface which opposes the outer peripheral surface of the first wall.

5. A ball joint as claimed in claim 1 wherein the retaining member comprises a circlip mounted on the dust cover.

6. A method of manufacturing a ball joint as claimed in claim 1 without bonding the bearing seat to the socket comprising:
inserting the ball portion of the ball stud into the bearing seat;
inserting the bearing seat into the bore of the seat-accommodating portion of the socket after inserting the ball portion into the bearing seat and sliding the covering portion of the bearing seat over the first wall of the covering portion of the portion until the second wall of the covering portion contacts the top surface of the seat-accommodating portion surrounding the first wall; and
attaching a first end of the dust cover to the ball stud and attaching a second end of the dust cover to the covering portion of the bearing seat with the second end of the dust cover contacting the outer peripheral surface of the second wall of the covering portion and the top surface of the seat-accommodating portion of the socket.

7. A ball joint as claimed in claim 1 wherein the bearing seat is a one-piece member.

8. A ball joint as claimed in claim 1 wherein the socket includes a connecting portion which adjoins the seat-accommodating portion for connecting the ball joint to another member, and a step is formed between the top surface of the seat-accommodating portion and a top surface of the connecting portion so that the top surface of the seat-accommodating portion where it is sealed to the dust cover is at a different height from the top surface of the connecting portion.

9. A ball joint as claimed in claim 1 wherein the inner surface of the bearing seat includes a spherical portion which slidably contacts the ball portion of the ball stud and a cylindrical portion which is coaxial with the bore of the seat-accommodating portion and which extends from an upper end of the spherical portion where the ball portion leaves contact with the inner surface of the bearing seat.

* * * * *

UNITED STATES PATENT AND TRADEMARK OFFICE
CERTIFICATE OF CORRECTION

PATENT NO. : 9,909,616 B2  
APPLICATION NO. : 14/442126  
DATED : March 6, 2018  
INVENTOR(S) : Yokoi et al.

Page 1 of 1

It is certified that error appears in the above-identified patent and that said Letters Patent is hereby corrected as shown below:

Column 9, Line 27 (Claim 1, Line 3), change "a first wall which protects" to --a first wall which projects--.

Column 10, Line 32 (Claim 6, Line 10), change "the covering portion of the portion" to --the seat-accommodating portion--.

Signed and Sealed this  
Tenth Day of July, 2018

Andrei Iancu  
*Director of the United States Patent and Trademark Office*